(12) United States Patent
Neal-Joslin (10) Patent No.: US 11,714,737 B2
(45) Date of Patent: Aug. 1, 2023

(54) TIME CLOCK QUALITY DETERMINATION

(71) Applicant: HEWLETT PACKARD ENTERPRISE DEVELOPMENT LP, Houston, TX (US)

(72) Inventor: Robert Raymond Neal-Joslin, Livermore, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 239 days.

(21) Appl. No.: 17/153,944

(22) Filed: Jan. 21, 2021

(65) Prior Publication Data

US 2022/0229462 A1 Jul. 21, 2022

(51) Int. Cl.
G06F 11/00 (2006.01)
G06F 11/30 (2006.01)
G06F 11/07 (2006.01)

(52) U.S. Cl.
CPC ...... *G06F 11/3089* (2013.01); *G06F 11/0706* (2013.01); *G06F 11/0754* (2013.01); *G06F 11/0757* (2013.01); *G06F 11/0793* (2013.01); *G06F 2201/81* (2013.01)

(58) Field of Classification Search
CPC ............ G06F 11/0706; G06F 11/0754; G06F 11/0757; G06F 11/0766; G06F 11/0769; G06F 11/0793; G06F 11/2268; G06F 11/3072; G06F 11/3075; G06F 11/3089; G06F 11/3409; G06F 11/3466; G06F 2201/81; G06F 2201/865; G06F 1/12; G06F 21/50; G06F 21/57; G06F 2221/034; G06F 1/14
See application file for complete search history.

(56) References Cited

U.S. PATENT DOCUMENTS

| | | | | |
|---|---|---|---|---|
| 5,826,066 A | * | 10/1998 | Jardine | G06F 1/14 713/400 |
| 6,742,048 B1 | | 5/2004 | Walsh | |
| 7,855,581 B2 | * | 12/2010 | Priel | G06F 1/14 327/20 |
| 8,559,421 B2 | * | 10/2013 | Merio | H04W 52/0293 370/352 |
| 8,817,937 B2 | * | 8/2014 | Greenspan | G06F 1/324 375/357 |

(Continued)

OTHER PUBLICATIONS

H. Kim, X. Ma and B. R. Hamilton, "Tracking Low-Precision Clocks With Time-Varying Drifts Using Kalman Filtering," in IEEE/ACM Transactions on Networking, vol. 20, No. 1, pp. 257-270, Feb. 2012, doi: 10.1109/TNET.2011.2158656. (Year: 2012).*

(Continued)

*Primary Examiner* — Anthony J Amoroso
(74) *Attorney, Agent, or Firm* — Trop, Pruner & Hu, P.C.

(57) ABSTRACT

In some examples, an electronic device records, in an entry of a time-state data structure that includes a plurality of entries to store respective times, a time in response to invocation of a time-lapse process that lasts a predefined time duration independently of a time clock of the electronic device. The electronic device determines whether times in successive entries of the plurality of entries of the time-state data structure are within a threshold of one another, the threshold based on the predefined time duration. Based on the determining, the electronic device sets a parameter representing a quality of the time clock.

20 Claims, 5 Drawing Sheets

(56) References Cited

U.S. PATENT DOCUMENTS

| 10,514,465 B2* | 12/2019 | Namineni | G06F 1/14 |
| 2004/0128528 A1 | 7/2004 | Poisner | |
| 2019/0113571 A1* | 4/2019 | Ackley | G01R 31/31922 |

OTHER PUBLICATIONS

D. Becker, R. Rabenseifner and F. Wolf, "Implications of non-constant clock drifts for the timestamps of concurrent events," 2008 IEEE International Conference on Cluster Computing, 2008, pp. 59-68, doi: 10.1109/CLUSTR.2008.4663756. (Year: 2008).*

Vater, F. et al.; "An On-chip Security Monitoring Solution for System Clock for Low Cost Devices"; printed on Sep. 28, 2020; from webpage: http://citeseerx.ist.psu.edu/viewdoc/download?doi=10.1.1.144.2576&rep=rep1&type=pdf (6 pages).

Wikipedia, "Network Time Protocol," Jan. 5, 2021, <https://en.wikipedia.org/w/index.php?title=Network_Time_Protocol&oldid=998524695>.

* cited by examiner

TIME CLOCK QUALITY DETERMINATION

BACKGROUND

An electronic device can include a time clock that keeps track of time. Some operations of the electronic device may depend on a current time provided by the time clock. If the time provided by the time clock is incorrect for any reason, then such operations may produce errors or other issues may arise.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An "electronic device" can refer to any or some combination of the following: a desktop computer, a notebook computer, a tablet computer, a server computer, a cloud computer, a smartphone, a storage system, a storage controller, a communication node, a vehicle, a controller in a vehicle, a game appliance, a household appliance, or any other type of electronic device.

Some operations of an electronic device are based on a time provided by a time clock. A "time clock" refers to a hardware component or a program (including machine-readable instructions) that keeps track of time. The time provided by the time clock can be expressed in any of various formats, such as time-in-seconds (also referred to as an "epoch"), an hour-minute-second format, and so forth. In some cases, the time provided by a time clock can also include a date (e.g., month, day, year).

Examples of operations that are dependent upon a current time can include security operations, such as security operations that perform actions at specified times. For example, a security action can include removing a security certificate or setting the security certificate to an expired state at a specified time. Another example operation involves managing snapshots of data. A snapshot refers to a point-in-time representation of data at a specific point in time. When a snapshot is taken, a timestamp based on a current time provided by a time clock when the snapshot was taken can be associated with the snapshot. Note that multiple snapshots can be taken at different times, and thus, different timestamps are associated with the different snapshots. The snapshots are managed based on the timestamps associated with the snapshots. Since snapshots take up storage space, older snapshots may be removed periodically or in response to other events. If a snapshot's timestamp is inaccurate, or a service removing the snapshot does not have an accurate representation of the time in the electronic device, then removal of a snapshot may result in removal of data earlier than intended.

There may be various causes of errors in the time provided by a time clock. For example, while trying to manage the time clock, a user or another entity (program or machine) may accidently or maliciously set an incorrect time for the time clock. As another example, an operation of the time clock may be disrupted, such as due to a power loss or another disruption.

In accordance with some implementations of the present disclosure, a quality-of-time determination engine sets a parameter representing a quality of a time clock of an electronic device based on times recorded into successive entries of a time-state data structure. The recording of the times into the time-state data structure is responsive to successive invocations of a time-lapse process (e.g., a sleep process) that lasts a predefined time duration (e.g., a predefined sleep duration) independently of the time clock.

In some examples, the quality of a time clock is based on the stability of the time clock. A "stability" of a time clock can refer to a measure that indicates whether the time clock has been subjected to a disruption that can cause the time clock to produce a wrong time value. For example, the disruption of the time clock can be due to a user or another entity setting a wrong time for the time clock. A user can set a time of the time clock through a user interface that allows the user to adjust the time clock 108. Another entity (a program or a machine) can adjust a time of the time clock through a respective interface.

In other examples, the quality of a time clock can be based on other types of measures, such as an accuracy of the time clock, a reliability of the time clock, or another type of measure.

Figure 1:
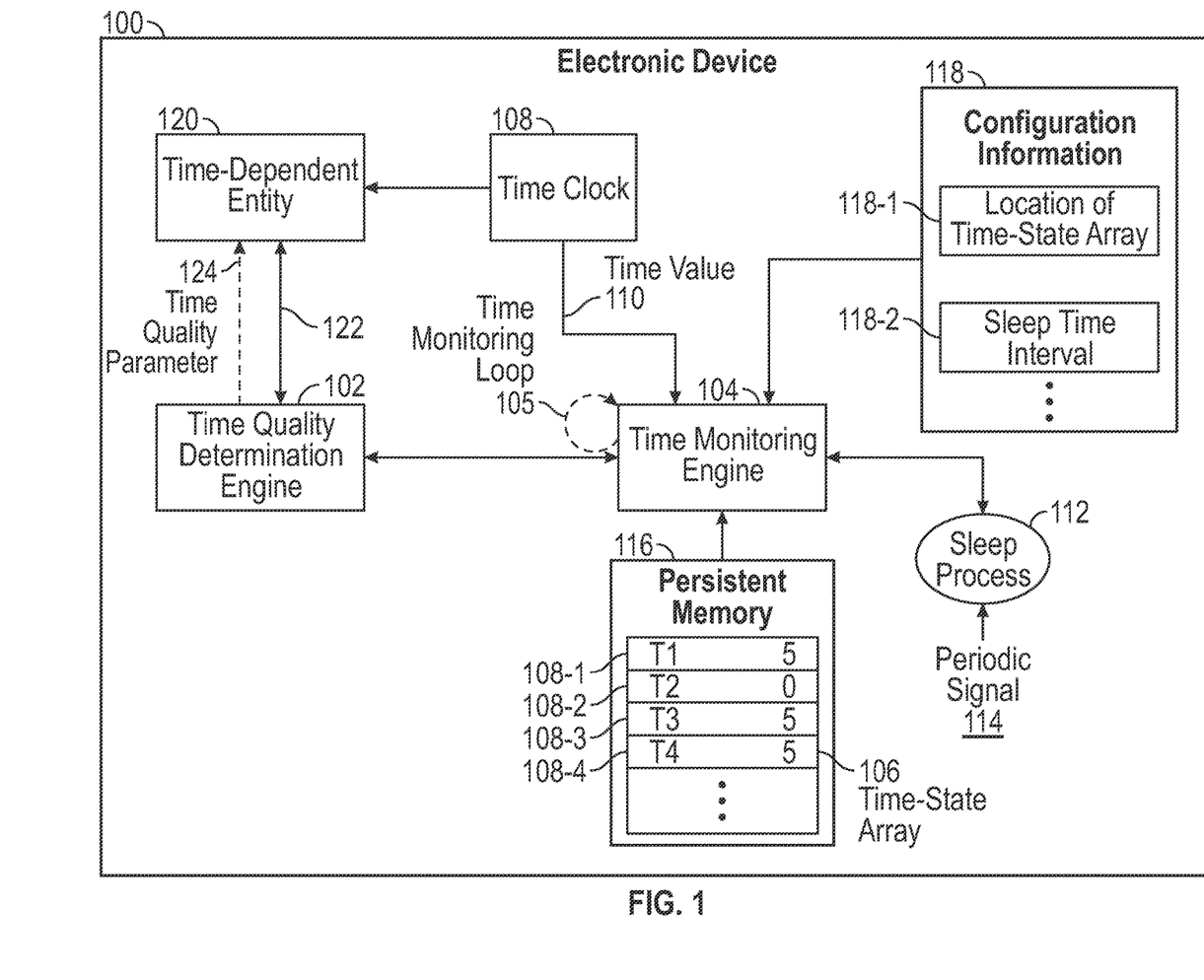
FIG. 1 is a block diagram of an electronic device that includes a time monitoring engine and quality-of-time determination engine, according to some examples.

FIG. 1 shows an example of an electronic device 100 that includes a time quality determination engine 102 and a time monitoring engine 104. As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

In the example of FIG. 1, the time-state data structure noted above is in the form of a time-state array 106 that includes multiple time-state entries into which times output by a time clock 108 can be recorded. Each time-state entry of the time-state array 106 includes a time attribute and a time duration indication attribute. The time attribute includes a time provided by the time clock 108, and the time duration indication attribute includes a time duration indication (discussed further below).

In other examples, the time-state data structure can have a different form.

As shown in FIG. 1, the time clock 108 produces a time value 110 that represents a current time of the electronic device 100. The time value 110 is updated by the time clock 108 with a passage of time. The time in the time value 110 can be recorded by the time monitoring engine 104 into a respective time-state entry of the time-state array 106.

A time monitoring process of the time monitoring engine 104 is a continual loop (referred to as a time monitoring loop 105) that continues until terminated. In the time monitoring loop 105, the time monitoring engine 104 invokes a sleep process 112, which sleeps for a predefined sleep duration. The sleep process 112 can be based on program code (including machine-readable instructions) that can employ a counter that counts a number of cycles of a periodic signal 114. The periodic signal 114 can be a clock signal generated by an oscillator (not shown) in the electronic device 100. A "clock signal" refers to a signal that fluctuates between different states (e.g., a high state and a low state) on a periodic basis. For example, the clock signal can be used to synchronize the operation of a processor of the electronic device 100, or can be another type of periodic signal.

The sleep process 112 counts a predefined quantity of cycles of the periodic signal 114, where the total time duration of the predefined quantity of cycles of the periodic signal 114 is the sleep duration of the sleep process 112.

Note that the quantity of cycles of the periodic signal 114 is independent of the output produced by the time clock 108. Thus, even if the time clock 108 were to suffer a disruption, the periodic signal 114 can continue to be active.

At the end of the sleep process 112 invoked by the time monitoring engine 104, the time monitoring engine 104 retrieves the time value 110 output by the time clock 108, and records the time represented by the time value 110 in the next time-state entry of the time-state array 106, along with a time duration indication (which can be set equal to the sleep duration of the sleep process 112 unless this is the first time through the time monitoring loop 105).

In the example of FIG. 1, four time-state entries 108-1, 108-2, 108-3, and 108-4 of the time-state array 106 are shown. The time-state entry 108-1 includes a time T1 (in the time attribute), and an associated time duration indication of "5" (in the time duration indication attribute) which can represent 5 seconds in examples where the sleep duration is 5 seconds. In other examples, the sleep duration may have a different time length.

The time-state entry 108-2 contains time T2 and a time duration indication of 0, which indicates that the time-state entry 108-2 was recorded in a first iteration of the time monitoring loop 105 (i.e., a first time through the time monitoring loop 105) performed by the time monitoring engine 104. For example, the electronic device 100 may have been reset such as due to a power loss or in response to a user requested shutdown), which would interrupt the time monitoring loop 105 performed by the time monitoring engine 104. Thus, the time duration indication of 0 in the time-state entry 108-2 provides an indication that there was some interruption of the time monitoring loop 105.

The time-state array 106 is stored in a persistent memory 116. As a result, time-state entries are not lost even though the time monitoring loop 105 was interrupted.

The persistent memory 116 can be implemented using a number (one or greater than one) of persistent memory devices. A persistent memory device is able to retain information stored in the persistent memory device even if power were to be removed from an electronic device in which the persistent memory device is located. In some examples, a persistent memory device can be implemented using a flash memory device, or a battery-backed volatile memory device (e.g., a dynamic random access memory (DRAM) device, a static random access memory (SRAM) device, etc.), and so forth.

In the first iteration through the time monitoring loop 105 after an interruption, the time monitoring engine 104 can retrieve time-state entries previously stored in the persistent memory 116, and can use such previous time-state entries in the time-state array 106 used by the time monitoring loop 105.

The time-state entries 108-3 and 108-4 include respective times T3 and T4, and each of the time-state entries includes a time duration indication of "5" that is the sleep duration of the sleep process 112 in some examples.

The time monitoring engine 104 can be configured using configuration information 118. The configuration information 118 can be stored in the persistent memory 116 or another memory.

The configuration information 118 can include information 118-1 relating to a location of the time-state array 106. For example, the information relating to the location of the time-state array 106 can include a uniform resource locator (URL), a file path of a file containing the time-state array 106, and so forth.

The configuration information 118 also includes a sleep time interval 118-2, which specifies the sleep duration of the sleep process 112. The sleep time interval 118-2 can be used by the time monitoring engine 104 to populate the time duration indication attribute (e.g., 5 seconds) in each time-state entry of the time-state array 106.

The electronic device 100 also includes a time-dependent entity 120, which can be a program or a hardware component. The time-dependent entity 120 performs operations that can be dependent upon a time produced by the time clock 108. Although FIG. 1 shows the time-dependent entity 120 as being part of the electronic device 100, in other examples, the time-dependent entity 120 may be external of the electronic device 100, and is able to communicate with the electronic device 100 over a network.

The time-dependent entity 120 can request (through an interface 122) that the time quality determination engine 102 provide information pertaining to a quality of the time clock 108. In some examples, the interface 122 can include an application programming interface (API), which includes various routines that can be called by the time-dependent entity 120 to invoke respective functions of the time quality determination engine 102.

In other examples, the interface 122 can be a different type of interface.

The measure of the quality of the time clock 108 can be represented by a time quality parameter 124 provided by the time quality determination engine 102 to the time-dependent entity 120 over the interface 122.

When requested to perform a time quality assessment by the time-dependent entity 120, the time quality determination engine 102 can obtain information of the time-state entries of the time-state array 106. The time quality determination engine 102 can request that the time monitoring engine 104 provide the information of the time-state entries, or alternatively, the time quality determination engine 102 can access the time-state array 106 directly.

Based on the information of the time-state entries, the time quality determination engine 102 can compute a value of the time quality parameter 124, which is returned to the time-dependent entity 120. The time-dependent entity 120 can determine a quality of the time clock 108 based on the value of the time quality parameter 124 returned by the time quality determination engine 102. If the time-dependent entity 120 determines, based on the time quality parameter 124, that the quality of the time clock 108 has dropped below a specified threshold, then the time-dependent entity 120 can either suspend its operation or provide a notification to an entity (e.g., a user, a program, or a machine) that the time clock 108 is not producing correct times, and that a resolution of the time clock 108 is requested before the time-dependent entity 120 takes any further action.

Figure 2:
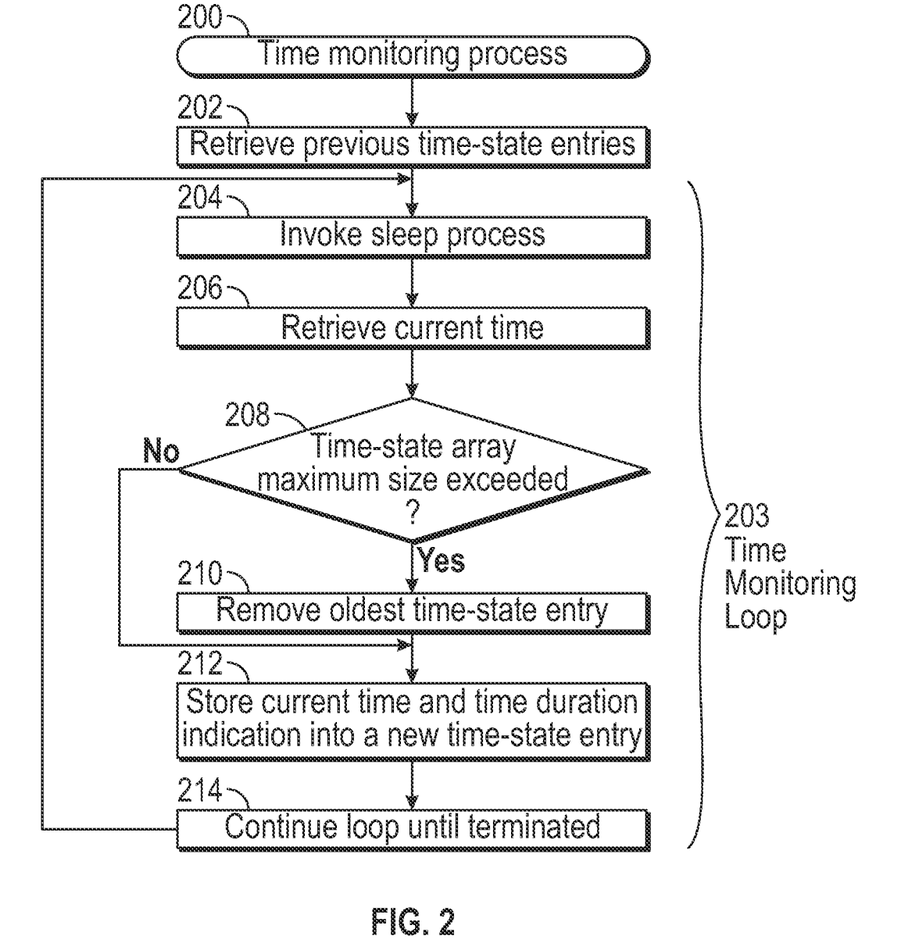
FIG. 2 is a flow diagram of a process of the time monitoring engine, according to some examples.

FIG. 2 is a flow diagram of a time monitoring process 200 that can be performed by the time monitoring engine 104 according to some examples. In other examples, the time monitoring process 200 uses a different sequence of tasks or alternative tasks.

The time monitoring process 200 is started when the time monitoring engine 104 is invoked, which can be at when the electronic device 100 starts (such as from a low power state or a power off state) or at the request of the user or another entity, such as a program or machine.

When the time monitoring process 200 first starts, the time monitoring engine 104 retrieves (at 202) any previous time-state entries from an existing time-state array 106 in the persistent memory 116. When the time monitoring process 200 initially starts, the time monitoring engine 104 can create a new time-state array 106 or can continue to use the existing time-state array 106. In either case, the time monitoring process 200 uses any previously recorded time-state entries (prior to interruption of the time monitoring process 200).

If a new time-state array 106 is created, then the new time-state array 106 can be populated using information of the time-state entries of the existing time-state array 106. If the time monitoring process 200 continues to use the existing time-state array 106, then the existing time-state array 106 can add new time-state entries to the existing time-state array 106.

Note that the time-state array 106 can have a maximum size to prevent overflowing the persistent memory 116. If adding a new time-state entry to the time-state array 106 would cause the maximum size to be exceeded, the time monitoring engine 104 can discard an older type-state entry (or multiple older time-state entries) from the time-state array 106.

Next, the time monitoring process 200 enters a time monitoring loop 203 that continues until terminated by an entity, such as a user, a program, or a machine.

In the time monitoring loop 203, the time monitoring engine 104 invokes (at 204) the sleep process 112 (FIG. 1). The sleep process 112 sleeps for a sleep duration.

When the sleep process 204 returns (the sleep duration has elapsed upon completion of the sleep process 204), the time monitoring engine 104 retrieves (at 206) a current time that is in the time value 110 provided by the time clock 108 (FIG. 1).

The time monitoring engine 104 determines (at 208) if the maximum size of the time-state array 106 will be exceeded if a new time-state entry were to be added to the time-state array 106. If so, the time monitoring engine 104 can remove (at 210) the oldest time-state entry from the time-state array 106. In other examples, the time monitoring engine 104 can remove a predetermined number of the oldest time-state entries from the time-state array 106.

The time monitoring engine 104 stores (at 212) the current time into a new time-state entry in the time-state array 106, along with a time duration indication. The time duration indication is equal to the sleep duration (e.g., 5 seconds) if this is not the first iteration of the time monitoring loop 203. However, if this is the first iteration of the time monitoring loop 203, then the time duration indication is set to 0 or a different specified value to indicate: that the time monitoring process 200 was interrupted and has started again, or this is the first time that the time monitoring process 200 has been performed in the electronic device 100. In other examples, if this is not the first iteration of the time monitoring loop 203, the time duration indication can be set to another value for indicating that this is not the first iteration of the time monitoring loop 203.

The time monitoring engine 104 continues (at 214) the time monitoring loop 203 until terminated.

The time monitoring process 200 performed by the time monitoring engine 104 continues to populate new time-state entries into the time-state array 106, which can be used to make a determination of the quality of the time clock 108 by the time quality determination engine 102.

Figure 3:
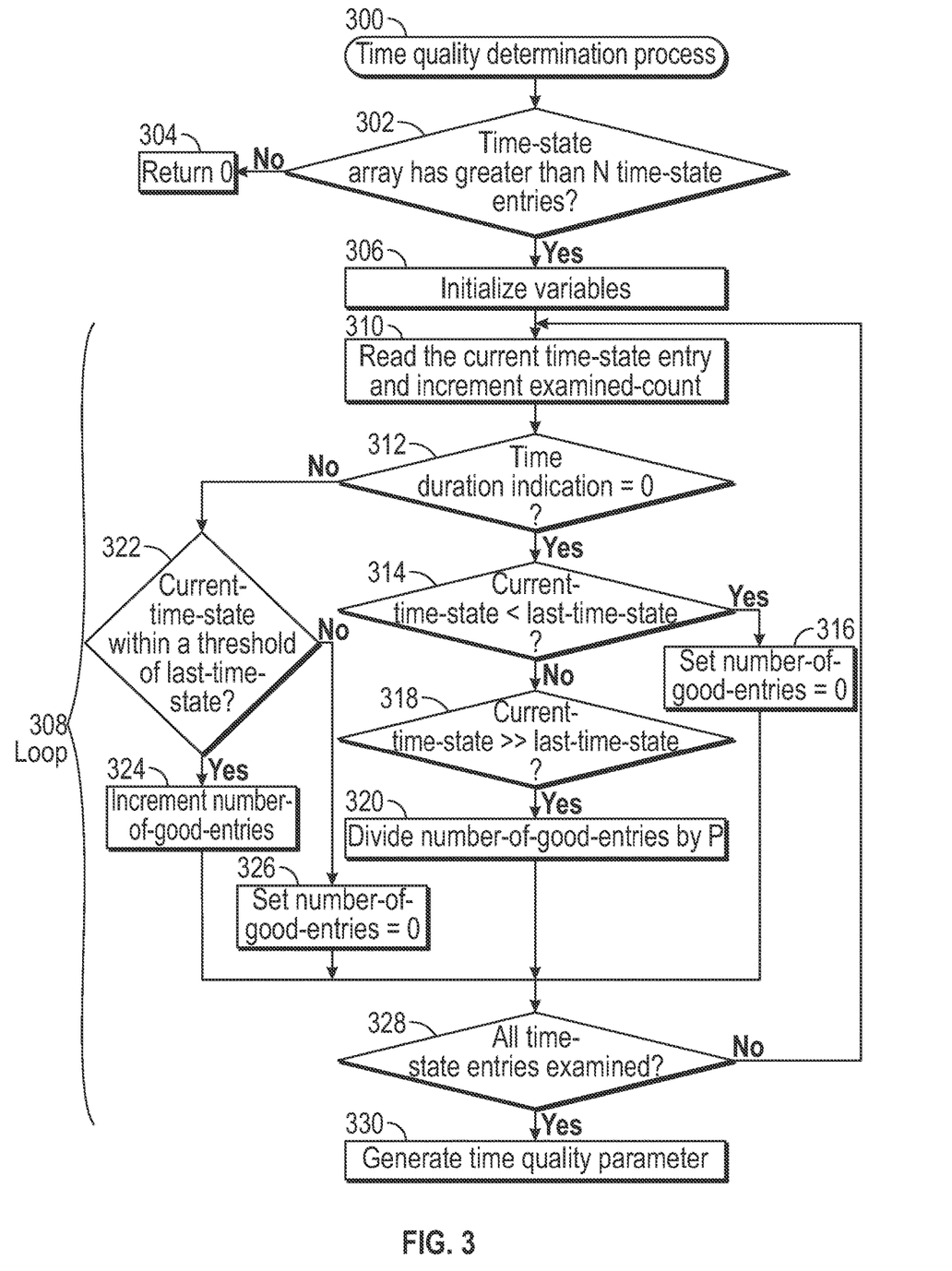
FIG. 3 is a flow diagram of a process of the quality-of-time determination engine, according to some examples.

FIG. 3 is a flow diagram of a time quality determination process 300 that can be performed by the time quality determination engine 102 in accordance with some implementations of the present disclosure. In other examples, the time quality determination process 300 uses a different sequence of tasks or alternative tasks.

In some examples, the time quality determination process 300 returns the time quality parameter 124 (FIG. 1) with a value between 0 and 10, where 0 indicates that the time clock 108 is not reliable, and a 10 indicating a highest degree of quality. Intermediate values between 0 and 10 indicate other quality levels of the time clock 108.

In other examples, the time quality parameter 124 can be set to values in a different range, or can be assigned categorical values (e.g., good, bad, neutral).

The time quality determination engine 102 determines (at 302) whether the time-state array 106 has greater than N (N 1) time-state entries. If the time-state array 106 does not have greater than N time-state entries, then the time quality determination engine 102 returns (at 304) a 0 value for the time quality parameter 124. The time-state array 106 with fewer than N time-state entries can be deemed to not have sufficient information to allow a meaningful assessment of the quality of the time clock 108.

If the time-state array 106 has greater than N time-state entries, then the time quality determination engine 102 initializes (at 306) variables that are used in computing the value of the time quality parameter 124. The variables can include the following: a last-time-state variable (which represents the time in the most recent time-state entry of the time-state array 106 read by the time quality determination engine 102), an examined-count variable (which represents a number of the time-state entries of the time-state array 106 that have been examined by the time quality determination process 300), a number-of-good-entries variable (which provides an indication of a quantity of "good" time-state entries in the time-state array 106).

A "good" time-state entry can refer to a time-state entry that contains a time that is not less than a previous time as represented by the last-time-state variable, and that is within an expected range with respect to a value that is based on a sum of the last-time-state and the sleep duration (explained further below in connection with FIG. 3). In some examples, the last-time-state variable can be initialized to the time in the first time-state entry (the oldest time-state entry) in the time-state array 106. The examined-count variable can be initialized to 0, and the number-of-good-entries variable can be initialized to 0.

In other examples, the variables can be initialized to other values. Also, in further examples, other types of variables may be employed by the time quality determination process 300.

The time quality determination process 300 processes all of the time-state entries in the time-state array 106. The processing is performed in a loop 308 that continues until the end of the time-state array 106 is reached. The loop 308 includes tasks 310 to 328.

The time quality determination engine 102 reads (at 310) the current time-state entry, which is the time-state entry that is currently being processed by the loop 308. With each iteration of the loop 308, the time quality determination engine 102 reads the next time-state entry of the time-state array 106. The time quality determination engine 102 also increments examined-count (e.g., by 1) to indicate that another time-state entry has been examined.

Although FIG. 3 shows that examined-count is incremented with each examination of a time-state array, in other examples, examined-count can be decremented (in such examples examined-count can be initialized to a high value). More generally, examined-count is advanced (incremented or decremented) as each time-state entry is examined.

The time quality determination engine 102 determines (at 312) if the time duration indication in the current time-state entry is equal to 0. If so, then that indicates that the time monitoring process 200 was interrupted.

If the time duration indication is equal to 0, the time quality determination engine 102 performs tasks 314 to 320. The time quality determination engine 102 determines (at 314) if current-time-state in the current time-state entry is less than last-time-state. Current-time-state contains the time of the current time-state entry. If current-time-state is less than last-time-state, then that indicates that the time clock 108 has gone backwards, which is an indication that the time clock 108 may not contain a correct time value.

If current-time-state is less than last-time-state, then the time quality determination engine 102 sets (at 316) number-of-good-entries to 0 (or another reset value).

If current-time-state is not less than last-time-state, then the time quality determination engine 102 determines (at 318) if current-time-state is significantly greater than last-time-state. Current-time-state is significantly greater than last-time-state if current-time-state exceeds last-time-state by M multiplied by the sleep duration, where M is a specified factor. For example, M can be set to 10 or a different value. Current-time-state being significantly greater than last-time-state means that the time monitoring engine 104 did not record time-state entries into the time-state array 106 for a relatively long time.

If the current-time-state is significantly greater than last-time-state, then the time quality determination engine 102 divides (at 320) number-of-good-entries by a factor P, where P can be a specified value, such as 2 or a different value.

In some examples, a larger value of number-of-good-entries would indicate that the quality of the time clock 108 is higher, while a lower value of number-of-good-entries would indicate that the quality of the time clock 108 is lower. Dividing number-of-good-entries by the factor P would cause a reduction in the indicated quality of the time clock 108.

In other examples, a lower value of number-of-good-entries would indicate that the quality of the time clock 108 is higher, while a higher value of number-of-good-entries would indicate that the quality of the time clock 108 is lower. In such examples, task 320 can multiply number-of-good-entries by the factor P.

If the time duration indication is not equal to 0 (which means that the time monitoring process 200 is not indicated as having been interrupted), as determined (at 312), the time quality determination engine 102 determines (at 322) if current-time-state is within a threshold of last-time-state—i.e., if a difference between current-time-state and last-time-state is within an expected range. For example, the threshold can be based on the sleep duration. In some examples, the threshold can be based on a percentage of a sum of last-time-state and the sleep duration. In some examples, if the current-time-state is within X % (e.g., 95% or another percentage such as 99%, 98%, 97%, 96%, 90%, 85%, 80%, etc.) of the sum of last-time-state and the sleep duration, then that indicates that current-time-state represents a good time value (i.e., the time clock is operating in an expected manner). Thus, in the above example, the expected range for current-time-state starts at X % of the sum of last-time-state and the sleep duration and ends at (100+(100−X))% of the sum of last-time-state and the sleep duration. For example, if X % is 95%, then the expected range for current-time-state starts at 95% of the sum of last-time-state and the sleep duration and ends at 105% of the sum of last-time-state and the sleep duration.

In other examples, the expected range of current-time-state relative to last-time-state can be expressed in a different way.

If current-time-state is within a threshold of last-time-state, the time quality determination engine 102 increments (at 324) the number-of-good-entries variable, such as by a value 1.

Although FIG. 3 shows that number-of-good-entries is incremented in response to current-time-state being within the threshold of last-time-state, in other examples, number-of-good-entries can be decremented (in such examples number-of-good-entries can be initialized to a high value). More generally, number-of-good-entries is advanced (incremented or decremented) in response to current-time-state being within the threshold of last-time-state.

If current-time-state is not within a threshold of last-time-state (e.g., current-time-state is outside X % of the sum of last-time-state and the sleep duration), the time quality determination engine 102 sets (at 326) the number-of-good-entries variable to 0 (or another reset value).

From any of task 324, 326, 320, or 316, the time quality determination engine 102 determines (at 328) if all time-state entries of the time-state array 106 have been examined. If not, the time quality determination process 300 returns to the beginning of the loop 308, to read the next current time-state entry (at 310).

If all time-state entries of the time-state array 106 have been examined, the time quality determination engine 102 generates (at 330) a value of the time quality parameter 124. For example, the value of the time quality parameter 124 can be set equal to the value of number-of-good-entries divided by the value of examined-count, multiplied by a factor such as 10. In other examples, the time quality parameter 124 can be computed in a different way.

Figure 4:
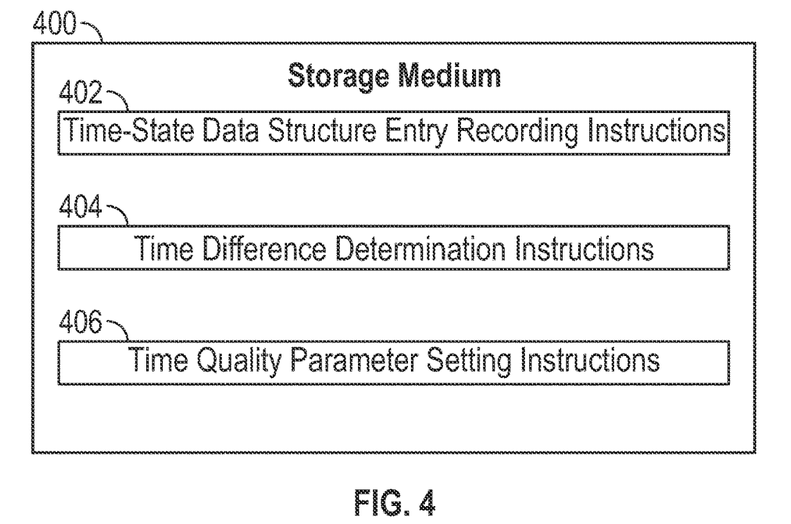
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause an electronic device to perform various tasks.

The machine-readable instructions include time-state data structure entry recording instructions 402 that record, in an entry of the time-state data structure (e.g., the time-state array 106 of FIG. 1), a time in response to invocation of a time-lapse process (e.g., the sleep process 112 of FIG. 1) that lasts a predefined time duration (e.g., a sleep duration) independently of a time clock of the electronic device.

The machine-readable instructions include time difference determination instructions 404 to determine whether times in successive entries of the time-state data structure are within a threshold that is based on the predefined time duration (e.g., sleep duration). For example, a current time in a current entry of the time-state data structure is within the threshold of a previous time in a previous entry of the time-state data structure if the current time is within X % of a sum of the previous time and the predefined time duration.

The machine-readable instructions include time quality parameter setting instructions 406 to, based on the determining, set a parameter representing a quality of the time clock.

In some examples, the machine-readable instructions are executable to determine whether given entries of the time-state data structure indicate that the time clock has moved backwards. In response to determining that the time clock has moved backwards, the machine-readable instructions are executable to cause an adjustment of the parameter to indicate a lower quality of the time clock (e.g., set number-of-good-entries to 0 or another reset value).

In some examples, the machine-readable instructions are executable to determine whether a first entry of the given entries contains an indication of an interruption of a time monitoring process (e.g., time duration indication set to 0). The determining of whether the given entries indicate that the time clock has moved backwards is in response to determining that the first entry contains the indication.

In some examples, the machine-readable instructions are executable to determine whether a second entry of the given entries contains a time that exceeds a time of the first entry by greater than a specified tolerance (e.g., greater than 10 times the sleep duration). In response to determining that the time of the second entry exceeds the time of the first entry by greater than the specified tolerance, the machine-readable instructions are executable to adjust a value of a variable used in computing the parameter in a specified manner (e.g., divide number-of-good-entries by P).

In some examples, the machine-readable instructions are executable to advance a value of the variable (e.g., increment number-of-good-entries by 1) in response to determining that the times in the successive entries of the time-state data structure are within the threshold (e.g., current-time-state is within X % of the sum of last-time-state and the sleep duration). Advancing the value of the variable causes the parameter to be set to a value representing a higher quality of the time clock.

In some examples, the machine-readable instructions are executable to set the parameter representing the quality of the time clock based on a first variable representing a quantity of entries of the plurality of entries that indicate an expected operation of the time clock (e.g., number-of-good-entries), and a second variable representing a quality of the plurality of entries that have been examined (e.g., examined-count).

Figure 5:
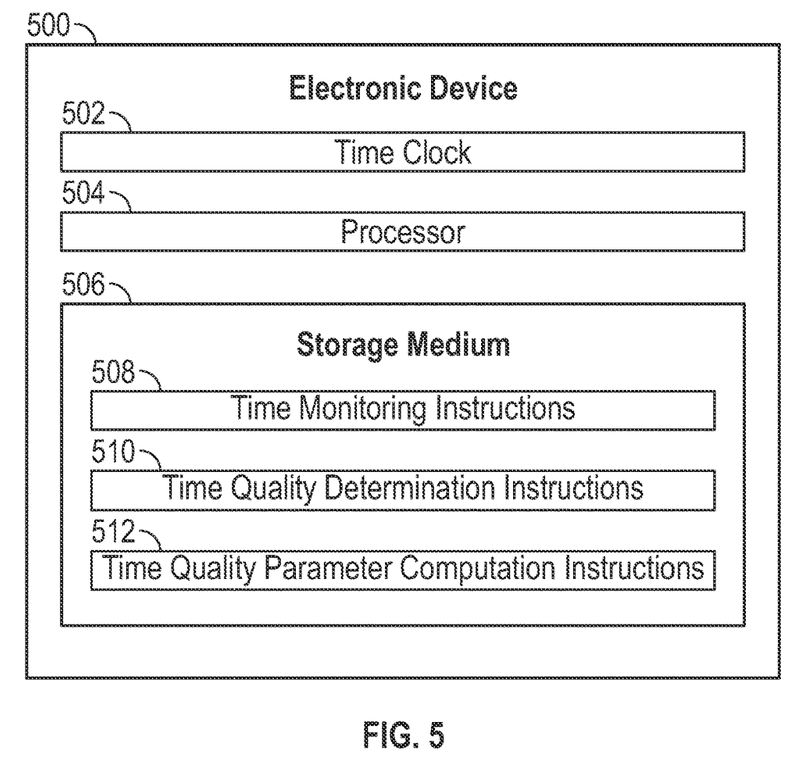
FIG. 5 is a block diagram of an electronic device according to further examples.

FIG. 5 is a block diagram of an electronic device 500 that includes a time clock 502 and a processor (or multiple processors) 504. A processor can include a microprocessor, a core of a multi-core microprocessor, a microcontroller, a programmable integrated circuit, a programmable gate array, or another hardware processing circuit.

The electronic device 500 includes a storage medium 506 storing machine-readable instructions executable on the processor 504 to perform various tasks. Machine-readable instructions executable on a processor can refer to the instructions executable on a single processor or the instructions executable on multiple processors.

The machine-readable instructions executable on the processor 504 include time monitoring instructions 508 to perform a time monitoring loop. In each iteration of the time monitoring loop, the time monitoring instructions 508 invoke a time-lapse process (e.g., the sleep process 112) that lasts a predefined time duration (e.g., a sleep duration) independently of the time clock 502, and record a time upon a return of the time-lapse process in a respective entry of a time-state data structure that includes entries to store respective times of the time clock 502.

The machine-readable instructions executable on the processor 504 include time quality determination instructions 510 to perform a time quality determination loop. In each iteration of the time quality determination loop, the time quality determination instructions 510 set variables based on times in successive entries of the time-state data structure.

The machine-readable instructions executable on the processor 504 include time quality parameter computation instructions 512 to compute a parameter representing a quality of the time clock based on values of the variables set in the time quality determination loop.

In some examples, in each iteration of the time monitoring loop, the time monitoring instructions 508 record an indication in the respective entry, where the indication is set to a first value for a first iteration of the time monitoring loop, and to a different second value for an iteration of the time monitoring loop other than the first iteration.

Figure 6:
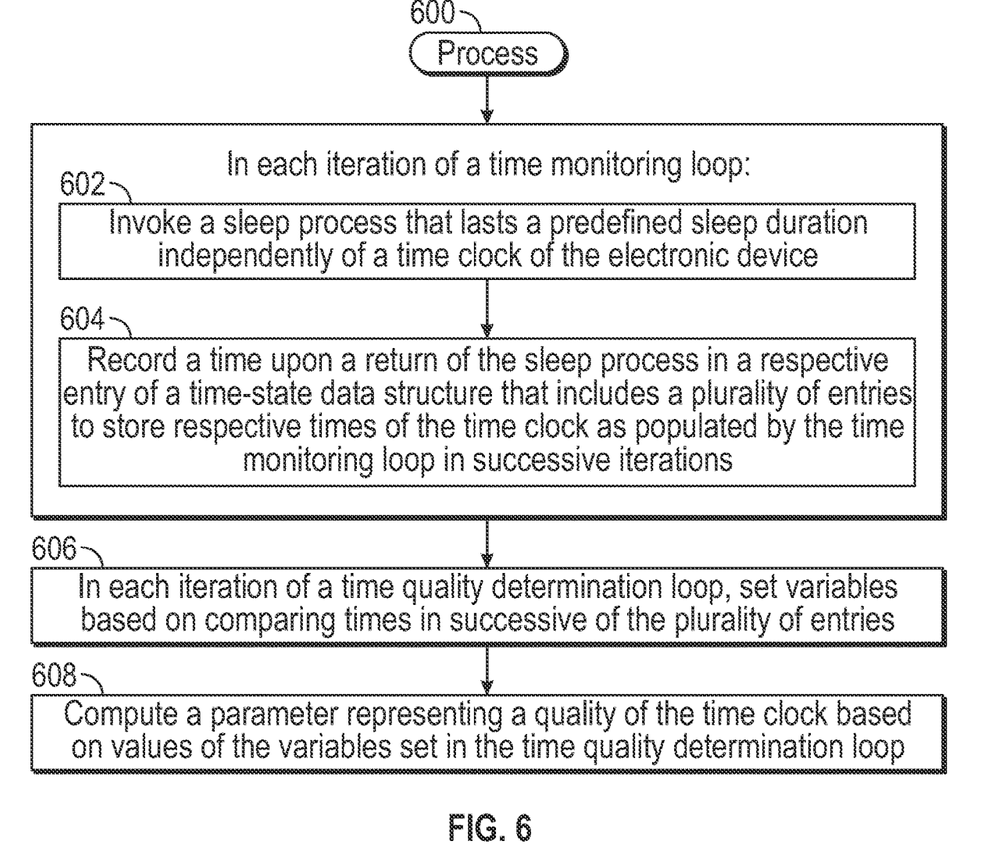
FIG. 6 is a flow diagram of a process according to some examples.

FIG. 6 is a flow diagram of a process 600 that can be performed by an electronic device (e.g., 100 in FIG. 1).

The process 600 includes, in each iteration of a time monitoring loop, invoking (at 602) a sleep process that lasts a predefined sleep duration independently of a time clock of the electronic device, and recording (at 604) a time upon a return of the sleep process in a respective entry of a time-state data structure that includes a plurality of entries to store respective times of the time clock as populated by the time monitoring loop in successive iterations.

The process 600 includes, in each iteration of a time quality determination loop, setting (at 606) variables based on comparing times in successive entries of the plurality of entries.

The process 600 includes computing (at 608) a parameter representing a quality of the time clock based on values of the variables set in the time quality determination loop.

A storage medium (e.g., 400 in FIG. 4 or 506 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions executable by an electronic device to:
   invoke a time-lapse process that lasts a predefined time duration independently of a time clock of the electronic device;
   record, in an entry of a time-state data structure that includes a plurality of entries to store respective times, a time in response to invocation of a return of the time-lapse process;
   determine whether times in successive entries of the plurality of entries of the time-state data structure are within a threshold of one another, the threshold based on the predefined time duration; and
   based on the determining, set a parameter representing a quality of the time clock, wherein setting the parameter representing the quality of the time clock is based on a first variable having a value based on a quantity of entries of the plurality of entries that indicate an expected operation of the time clock, and a second variable having a value based on a quantity of the plurality of entries that have been examined.

2. The non-transitory machine-readable storage medium of claim 1, wherein the time-lapse process is a sleep process that sleeps for the predefined time duration when invoked.

3. The non-transitory machine-readable storage medium of claim 1, wherein the instructions are executable by the electronic device to:
   determine whether given entries of the plurality of entries of the time-state data structure indicate that the time clock has moved backwards; and
   in response to determining that the time clock has moved backwards, cause an adjustment of the parameter to indicate a lower quality of the time clock.

4. The non-transitory machine-readable storage medium of claim 3, wherein the instructions are executable by the electronic device to:
   determine whether a first entry of the given entries contains an indication of an interruption of a time monitoring process,
   wherein the determining of whether the given entries indicate that the time clock has moved backwards is in response to determining that the first entry contains the indication.

5. The non-transitory machine-readable storage medium of claim 4, wherein the time monitoring process records times into entries of the time-state data structure.

6. The non-transitory machine-readable storage medium of claim 4, wherein the instructions are executable by the electronic device to:
   determine whether a second entry of the given entries contains a time that exceeds a time of the first entry by greater than a specified tolerance; and
   in response to determining that the time of the second entry exceeds the time of the first entry by greater than the specified tolerance, adjust a value of the first variable used in computing the parameter in a specified manner.

7. The non-transitory machine-readable storage medium of claim 3, wherein the causing of the adjustment of the parameter to indicate the lower quality of the time clock comprises:
   adjusting the first variable used in computing the parameter to a reset value.

8. The non-transitory machine-readable storage medium of claim 7, wherein the instructions are executable by the electronic device to:
   advance a value of the first variable in response to determining that the times in the successive entries of the plurality of entries of the time-state data structure are within the threshold of one another,
   wherein the advancing of the value of the first variable causes the parameter to be set to a value representing a higher quality of the time clock.

9. The non-transitory machine-readable storage medium of claim 1, wherein each entry of the plurality of entries comprises a time attribute set to a time of the time clock, and a further attribute, and wherein the instructions are executable by the electronic device to:
   set the further attribute of a given entry of the plurality of entries to a first value in response to determining that the instructions are performing a first iteration of a time monitoring process; and
   set the further attribute of the given entry to a different second value in response to determining that the instructions are performing an iteration of the time monitoring process other than the first iteration.

10. The non-transitory machine-readable storage medium of claim 9, wherein the second value represents the predefined time duration.

11. The non-transitory machine-readable storage medium of claim 1, wherein the instructions are executable by the electronic device to:
   determine that a first entry of the plurality of entries in the time-state data structure indicates that the time clock has an expected operation when a first time in the first entry is within an expected range of a sum of a second time in a second entry of the plurality of entries in the time-state data structure and a sleep duration, wherein the first entry is currently being processed and the second entry is the last previously processed entry in the time-state data structure.

12. An electronic device comprising:
   a time clock;
   a processor; and
   a non-transitory storage medium comprising instructions executable on the processor to:
   perform a time monitoring loop comprising:
      in each iteration of the time monitoring loop, invoking a time-lapse process that lasts a predefined time duration independently of the time clock, and recording a time upon a return of the time-lapse process in a respective entry of a time-state data structure that includes a plurality of entries to store respective times;
   perform a time quality determination loop comprising:
      in each iteration of the time quality determination loop, setting variables based on times in successive entries of the plurality of entries; and
   compute a parameter representing a quality of the time clock based on values of the variables set in the time quality determination loop, wherein the variables comprise a first variable having a value based on a quantity of entries of the plurality of entries indicating that the time clock has an expected operation, and a second variable having a value based on a quantity of the plurality of entries that have been examined in the time quality determination loop.

13. The electronic device of claim 12, wherein the time-lapse process comprises a sleep process that counts a predefined quantity of cycles of a periodic signal.

14. The electronic device of claim 12, wherein the instructions are executable on the processor to:
in each iteration of the time monitoring loop, record an indication in the respective entry, the indication set to a first value for a first iteration of the time monitoring loop, and to a different second value for an iteration of the time monitoring loop other than the first iteration.

15. The electronic device of claim 12, wherein the instructions are executable on the processor to:
adjust the first variable to indicate a poorer quality of the time clock in response to a determination that the time clock has moved backwards based on the plurality of entries.

16. The electronic device of claim 12, wherein the instructions are executable on the processor to:
determine that a first entry of the plurality of entries in the time-state data structure indicates that the time clock has an expected operation when a first time in the first entry is within an expected range of a sum of a second time in a second entry of the plurality of entries in the time-state data structure and a sleep duration, wherein the first entry is currently being processed and the second entry is the last previously processed entry in the time-state data structure.

17. A method of an electronic device, comprising:
in each iteration of a time monitoring loop, invoking a sleep process that lasts a predefined sleep duration independently of a time clock of the electronic device, and recording a time upon a return of the sleep process in a respective entry of a time-state data structure that includes a plurality of entries to store respective times of the time clock as populated by the time monitoring loop in successive iterations;
in each iteration of a time quality determination loop, setting variables based on comparing times in successive entries of the plurality of entries; and
computing a parameter representing a quality of the time clock based on values of the variables set in the time quality determination loop, wherein the variables comprise a first variable having a value based on a quantity of entries of the plurality of entries indicating that the time clock has an expected operation, and a second variable having a value based on a quantity of the plurality of entries that have been examined in the time quality determination loop.

18. The method of claim 17, wherein setting the variables comprise:
advancing a value of the first variable of the variables in response to a first time in a first entry of the plurality of entries being within a threshold of a second time in a second entry of the plurality of entries; and
resetting the first variable in response to determining that the time clock has moved backwards based on the times in the plurality of entries.

19. The method of claim 17, wherein the instructions are executable on the processor to:
determine that a first entry of the plurality of entries in the time-state data structure indicates that the time clock has an expected operation when a first time in the first entry is within an expected range of a sum of a second time in a second entry of the plurality of entries in the time-state data structure and a sleep duration, wherein the first entry is currently being processed and the second entry is the last previously processed entry in the time-state data structure.

20. The method of claim 19, wherein the sleep duration is stored in one of the plurality of entries of the time-state data structure.

* * * * *